United States Patent
Kadous

(10) Patent No.: US 7,177,351 B2
(45) Date of Patent: *Feb. 13, 2007

(54) DATA TRANSMISSION WITH NON-UNIFORM DISTRIBUTION OF DATA RATES FOR A MULTIPLE-INPUT MULTIPLE-OUTPUT (MIMO) SYSTEM

(75) Inventor: Tamer Kadous, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/624,241

(22) Filed: Jul. 21, 2003

(65) Prior Publication Data

US 2004/0037235 A1    Feb. 26, 2004

Related U.S. Application Data

(63) Continuation of application No. 10/087,503, filed on Mar. 1, 2002, now Pat. No. 6,636,568.

(51) Int. Cl.
*H04B 3/46* (2006.01)

(52) U.S. Cl. .................................. 375/225

(58) Field of Classification Search ............... 375/219, 375/225, 220, 259, 260, 296, 347, 348, 344, 375/295, 349, 222, 227; 370/210, 206, 328; 445/42

See application file for complete search history.

(56) References Cited

U.S. PATENT DOCUMENTS

| | | | | |
|---|---|---|---|---|
| 5,790,537 A | * | 8/1998 | Yoon et al. ................. | 370/342 |
| 5,812,938 A | * | 9/1998 | Gilhousen et al. ............ | 455/69 |
| 6,067,315 A | * | 5/2000 | Sandin ........................ | 370/252 |
| 6,075,797 A | * | 6/2000 | Thomas ....................... | 370/468 |
| 6,141,317 A | | 10/2000 | Marchok et al. ............. | 370/208 |
| 6,154,484 A | | 11/2000 | Lee et al. .................... | 375/130 |
| 6,175,550 B1 | * | 1/2001 | van Nee ..................... | 370/206 |
| 6,249,683 B1 | * | 6/2001 | Lundby et al. ............. | 455/522 |
| 6,271,946 B1 | * | 8/2001 | Chang et al. ................. | 398/79 |
| 6,449,246 B1 | * | 9/2002 | Barton et al. ................ | 370/210 |
| 6,477,317 B1 | * | 11/2002 | Itokawa ....................... | 386/95 |
| 6,487,243 B1 | * | 11/2002 | Hwang et al. .............. | 375/222 |
| 6,636,568 B2 | * | 10/2003 | Kadous ....................... | 375/225 |
| 2003/0076878 A1 | * | 4/2003 | Jones et al. ................. | 375/219 |
| 2003/0112745 A1 | * | 6/2003 | Zhuang et al. .............. | 370/208 |
| 2004/0086055 A1 | * | 5/2004 | Li ............................... | 375/260 |

* cited by examiner

*Primary Examiner*—Emmanuel Bayard
(74) *Attorney, Agent, or Firm*—Philip R. Wadsworth; Sandip (Micky) S. Minhas; Dmitry R. Milikovsky

(57) ABSTRACT

Techniques to determine data rates for a number of data streams transmitted via a number of transmission channels (or transmit antennas) in a multi-channel (e.g., MIMO) communication system. In one method, the "required" SNR for each data rate to be used is initially determined, with at least two data rates being unequal. The "effective" SNR for each data stream is also determined based on the received SNR and successive interference cancellation processing at the receiver to recover the data streams. The required SNR for each data stream is then compared against its effective SNR. The data rates are deemed to be supported if the required SNR for each data stream is less than or equal to its effective SNR. A number of sets of data rates may be evaluated, and the rate set associated with the minimum received SNR may be selected for use for the data streams.

29 Claims, 6 Drawing Sheets

DATA TRANSMISSION WITH NON-UNIFORM DISTRIBUTION OF DATA RATES FOR A MULTIPLE-INPUT MULTIPLE-OUTPUT (MIMO) SYSTEM

CROSS-REFERENCE TO RELATED APPLICATION

This application is a continuation application of U.S. patent application Ser. No. 10/087,503 filed on Mar. 1, 2002, now U.S. Pat. No. 6,636,568 which is assigned to the same assignee and which is incorporated herein by reference in its entirety.

BACKGROUND

1. Field

The present invention relates generally to data communication, and more specifically to techniques for determining a non-uniform distribution of data rates to be used for multiple data streams to be transmitted via multiple transmission channels of a multi-channel communication system, e.g., a multiple-input multiple-output (MIMO) system.

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized.

For a full-rank MIMO channel, where $N_S = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power. Moreover, if successive interference cancellation processing is used at the receiver to recover the transmitted data streams (described below), then different SNRs may be achieved for the data streams depending on the specific order in which the data streams are recovered. Consequently, different data rates may be supported by different data streams, depending on their achieved SNRs. Since the channel conditions typically vary with time, the data rate supported by each data stream also varies with time.

If the characteristics of the MIMO channel (e.g., the achieved SNRs for the data streams) are known at the transmitter, then the transmitter may be able to determine a particular data rate and coding and modulation scheme for each data stream such that an acceptable level of performance (e.g., one percent packet error rate) may be achieved for the data stream. However, for some MIMO systems, this information is not available at the transmitter. Instead, what may be available is very limited amount of information regarding, for example, the operating SNR for the MIMO channel, which may be defined as the expected SNR for all data streams at the receiver. In this case, the transmitter would need to determine the proper data rate and coding and modulation scheme for each data stream based on this limited information.

There is therefore a need in the art for techniques to determine a set of data rates for multiple data streams to achieve high performance when limited information is available at the transmitter for the MIMO channel.

SUMMARY

Techniques are provided herein to provide improved performance for a MIMO system when channel state information indicative of the current channel conditions is not available at the transmitter. In an aspect, a non-uniform distribution of data rates is used for the transmitted data streams. The data rates may be selected to achieve (1) a specified overall spectral efficiency with a lower minimum "received" SNR (described below) or (2) a higher overall spectral efficiency for a specified received SNR. A specific scheme for achieving each of the above objectives is provided herein.

In a specific embodiment that may be used to achieve the first objective noted above, a method is provided for determining data rates to be used for a number of data streams to be transmitted via a number of transmission channels in a multi-channel communication system (e.g., one data stream may be transmitted over each transmit antenna in a MIMO system). In accordance with the method, the required SNR for each of a number of data rates to be used for the data streams is initially determined. At least two of the data rates are unequal. The "effective" SNR (described below) for each data stream is also determined based on the received SNR and successive interference cancellation processing at the receiver (also described below) to recover the data streams. The required SNR for each data stream is then compared against the effective SNR for the data stream. The data rates are deemed to be supported if the required SNR for each data stream is less than or equal to the effective SNR for the data stream. A number of sets of data rates may be evaluated, and the rate set associated with the minimum received SNR may be selected for use for the data streams.

In a specific embodiment that may be used to achieve the second objective noted above, a method is provided for determining data rates for a number of data streams to be transmitted via a number of transmission channels (e.g., transmit antennas) in a multi-channel (e.g., MIMO) communication system. In accordance with the method, the received SNR is initially determined. This received SNR may be specified for the system or may be estimated based on measurements at the receiver and periodically provided to the transmitter. The effective SNR for each data stream is also determined based on the received SNR and successive interference cancellation processing at the receiver. The data rate for each data stream is then determined based on the effective SNR for the data stream, with at least two of the data rates being unequal.

Various aspects and embodiments of the invention are described in further detail below. The invention further provides methods, processors, transmitter units, receiver units, base stations, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for determining a set of data rates for multiple data streams based on limited channel state information may be implemented in various multi-channel communication systems. Such multi-channel communication systems include multiple-input multiple-output (MIMO) communication systems, orthogonal frequency division multiplexing (OFDM) communication systems, MIMO systems that employ OFDM (i.e., MIMO-OFDM systems), and so on. For clarity, various aspects and embodiments are described specifically for a MIMO system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or transmission channel) of the MIMO channel. The number of spatial subchannels is determined by the number of eigenmodes for the MIMO channel, which in turn is dependent on a channel response matrix, $\underline{H}$, that describes the response between the $N_T$ transmit and $N_R$ receive antennas. The elements of the channel response matrix, $\underline{H}$, are composed of independent Gaussian random variables $\{h_{i,j}\}$, for $i=1, 2, \ldots N_R$ and $j=1, 2, \ldots N_T$, where $h_{i,j}$ is the coupling (i.e., the complex gain) between the j-th transmit antenna and the i-th receive antenna. For simplicity, the channel response matrix, $\underline{H}$, is assumed to be full-rank (i.e., $N_S=N_T \leq N_R$), and one independent data stream may be transmitted from each of the $N_T$ transmit antennas.

Figure 1:
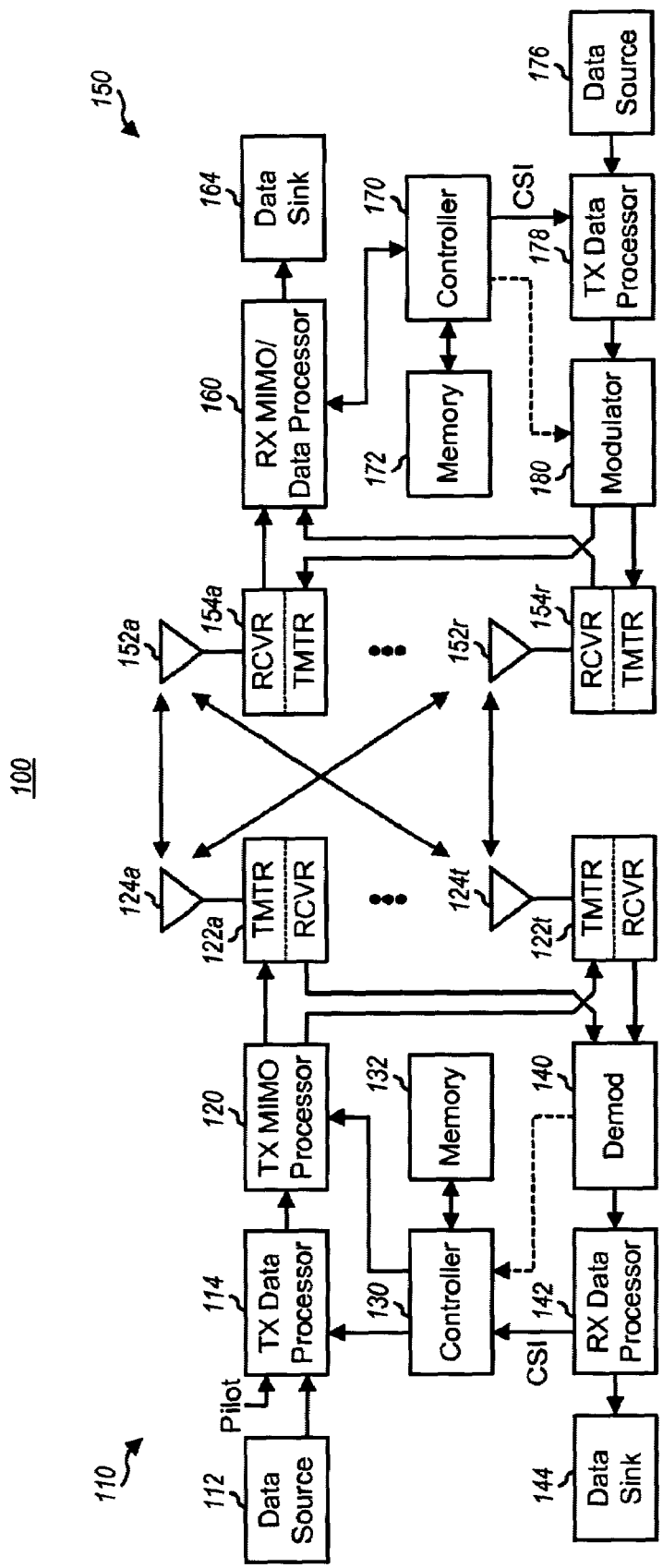
FIG. 1 is a block diagram of an embodiment of a transmitter system and a receiver system in a MIMO system.

FIG. 1 is a block diagram of an embodiment of a transmitter system 110 and a receiver system 150 in a MIMO system 100.

At transmitter system 110, traffic data for a number of data streams is provided from a data source 112 to a transmit (TX) data processor 114. In an embodiment, each data stream is transmitted over a respective transmit antenna. TX data processor 114 formats, codes, and interleaves the traffic data for each data stream based on a particular coding scheme selected for that data stream to provide coded data.

The coded data for each data stream may be multiplexed with pilot data using, for example, time division multiplexing (TDM) or code division multiplexing (CDM). The pilot data is typically a known data pattern that is processed in a known manner (if at all), and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by controls provided by a controller 130.

The modulation symbols for all data streams are then provided to a TX MIMO processor 120, which may further process the modulation symbols (e.g., for OFDM). TX MIMO processor 120 then provides $N_T$ modulation symbol streams to $N_T$ transmitters (TMTR) 122a through 122t. Each transmitter 122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 122a through 122t are then transmitted from $N_T$ antennas 124a through 124t, respectively.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and downconverts) a respective received signal, digitizes the conditioned signal to provide samples, and further processes the samples to provide a corresponding "received" symbol stream.

An RX MIMO/data processor 160 then receives and processes the $N_R$ received symbol streams from $N_R$ receivers 154 based on a particular receiver processing technique to provide $N_T$ "detected" symbol streams. The processing by RX MIMO/data processor 160 is described in further detail below. Each detected symbol stream includes symbols that are estimates of the modulation symbols transmitted for the corresponding data stream. RX MIMO/data processor 160 then demodulates, deinterleaves, and decodes each detected symbol stream to recover the traffic data for the data stream. The processing by RX MIMO/data processor 160 is complementary to that performed by TX MIMO processor 120 and TX data processor 114 at transmitter system 110.

RX MIMO processor 160 may derive an estimate of the channel response between the $N_T$ transmit and $N_R$ receive antennas, e.g., based on the pilot multiplexed with the traffic data. The channel response estimate may be used to perform space or space/time processing at the receiver. RX MIMO processor 160 may further estimate the signal-to-noise-and-interference ratios (SNRs) of the detected symbol streams, and possibly other channel characteristics, and provides these quantities to a controller 170. RX MIMO/data processor 160 or controller 170 may further derive an estimate of the "operating" SNR for the system, which is indicative of the conditions of the communication link. Controller 170 then provides channel state information (CSI), which may comprise various types of information regarding the communication link and/or the received data stream. For example, the CSI may comprise only the operating SNR. The CSI is then processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, demodulated by a demodulator 140, and processed by a RX data processor 142 to recover the CSI reported by the receiver system. The reported CSI is then provided to controller 130 and used to (1) determine the data rates and coding and modulation schemes to be used for the data streams and (2) generate various controls for TX data processor 114 and TX MIMO processor 120.

Controllers 130 and 170 direct the operation at the transmitter and receiver systems, respectively. Memories 132 and 172 provide storage for program codes and data used by controllers 130 and 170, respectively.

The model for the MIMO system may be expressed as:

$$\underline{y} = \underline{H}\underline{x} + \underline{n}, \quad \text{Eq}(1)$$

where $\underline{y}$ is the received vector, i.e., $\underline{y} = [y_1, y_2 \ldots y_{N_R}]^T$, where $\{y_i\}$ is the entry received on the i-th received antenna and $i \in \{1, \ldots, N_R\}$;

$\underline{x}$ is the transmitted vector, i.e., $\underline{x} = [x_1 \, x_2 \ldots x_{N_T}]^T$, where $\{x_j\}$ is the entry transmitted from the j-th transmit antenna and $j \in \{1, \ldots, N_T\}$;

$\underline{H}$ is the channel response matrix for the MIMO channel;

$\underline{n}$ is the additive white Gaussian noise (AWGN) with a mean vector of $\underline{0}$ and a covariance matrix of $\underline{\Lambda}_n = \sigma^2 \underline{I}$, where $\underline{0}$ is a vector of zeros, $\underline{I}$ is the identity matrix with ones along the diagonal and zeros everywhere else, and $\sigma^2$ is the variance of the noise; and $[\cdot]^T$ denotes the transpose of $[\cdot]$.

Due to scattering in the propagation environment, the $N_T$ symbol streams transmitted from the $N_T$ transmit antennas interfere with each other at the receiver. In particular, a given symbol stream transmitted from one transmit antenna may be received by all $N_R$ receive antennas at different amplitudes and phases. Each received signal may then include a component of each of the $N_T$ transmitted symbol streams. The $N_R$ received signals would collectively include all $N_T$ transmitted symbols streams. However, these $N_T$ symbol streams are dispersed among the $N_R$ received signals.

At the receiver, various processing techniques may be used to process the $N_R$ received signals to detect the $N_T$ transmitted symbol streams. These receiver processing techniques may be grouped into two primary categories:

spatial and space-time receiver processing techniques (which are also referred to as equalization techniques), and "successive nulling/equalization and interference cancellation" receiver processing technique (which is also referred to as "successive interference cancellation" or "successive cancellation" receiver processing technique).

In general, the spatial and space-time receiver processing techniques attempt to separate out the transmitted symbol streams at the receiver. Each transmitted symbol stream may be "detected" by (1) combining the various components of the transmitted symbol stream included in the $N_R$ received signals based on an estimate of the channel response and (2) removing (or canceling) the interference due to the other symbol streams. These receiver processing techniques attempt to either (1) decorrelate the individual transmitted symbol streams such that there is no interference from the other symbol streams or (2) maximize the SNR of each detected symbol stream in the presence of noise and interference from the other symbol streams. Each detected symbol stream is then further processed (e.g., demodulated, deinterleaved, and decoded) to recover the traffic data for the symbol stream.

The successive cancellation receiver processing technique attempts to recover the transmitted symbol streams, one at a time, using spatial or space-time receiver processing, and to cancel the interference due to each "recovered" symbol stream such that later recovered symbol streams experience less interference and may be able to achieve higher SNRs. The successive cancellation receiver processing technique may be used if the interference due to each recovered symbol stream can be accurately estimated and canceled, which requires error-free or low-error recovery of the symbol stream. The successive cancellation receiver processing technique (which is described in further detail below) generally outperforms the spatial/space-time receiver processing techniques.

For the successive cancellation receiver processing technique, the $N_R$ received symbol streams are processed by $N_T$ stages to successively recover one transmitted symbol stream at each stage. As each transmitted symbol stream is recovered, the interference it causes to the remaining not yet recovered symbol streams is estimated and canceled from the received symbol streams, and the "modified" symbol streams are further processed by the next stage to recover the next transmitted symbol stream. If the transmitted symbol streams can be recovered without error (or with minimal errors) and if the channel response estimate is reasonably accurate, then cancellation of the interference due to the recovered symbol stream is effective, and the SNR of each subsequently recovered symbol stream is improved. In this way, higher performance may be achieved for all transmitted symbol streams (possibly except for the first transmitted symbol stream to be recovered).

Figure 6:
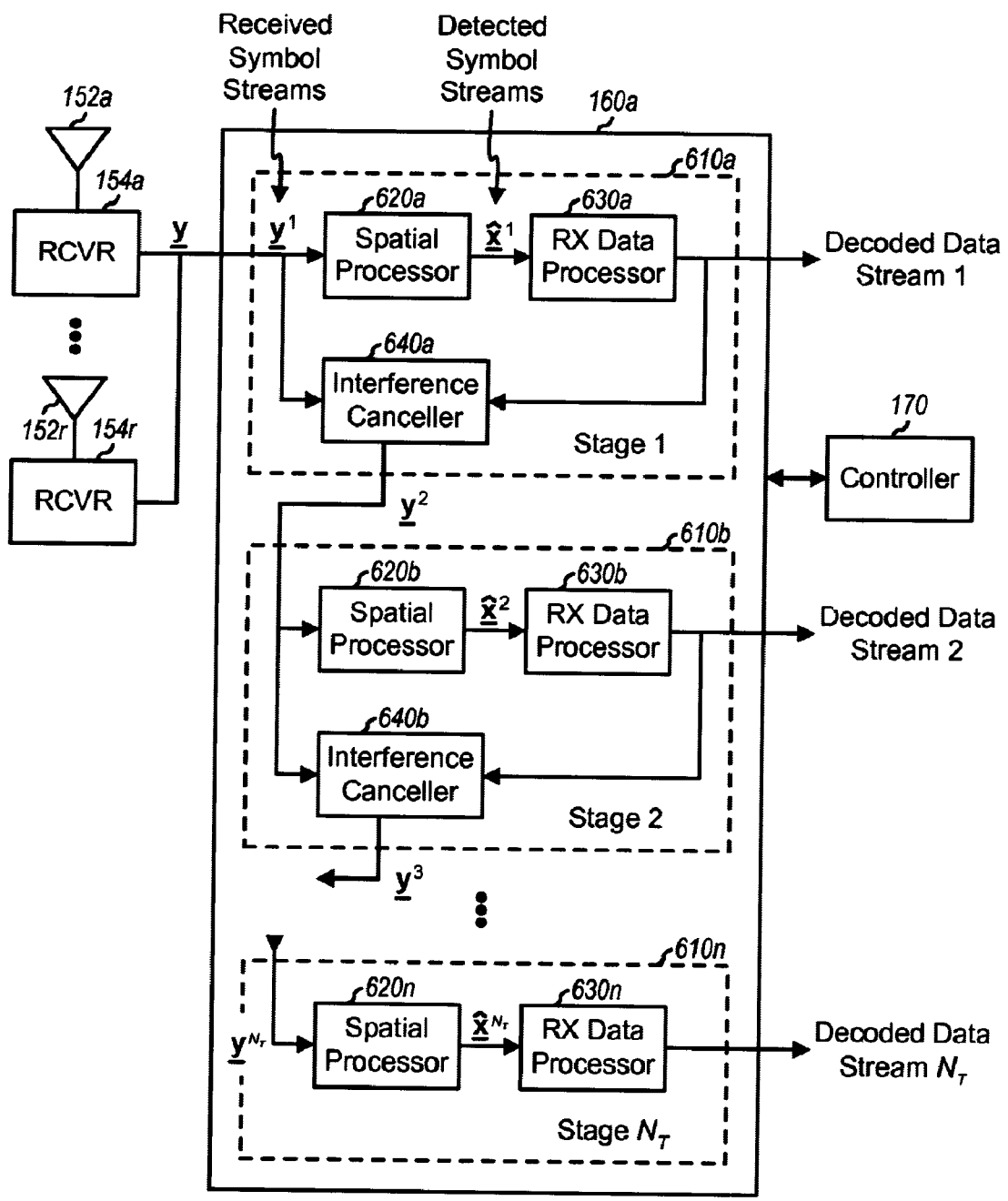
FIG. 6 is a block diagram of an embodiment of a receiver unit capable of implementing the successive interference cancellation receiver processing technique.

The following terminology is used herein:

"transmitted" symbol streams—the symbol streams transmitted from the transmit antennas;

"received" symbol streams—the inputs to a spatial or space-time processor in the first stage of a successive interference cancellation (SIC) receiver (see FIG. 6);

"modified" symbol streams—the inputs to the spatial or space-time processor in each subsequent stage of the SIC receiver;

"detected" symbol streams—the outputs from the spatial processor (up to $N_T-k+1$ symbol streams may be detected at stage k); and "recovered" symbol stream—a symbol stream that has been decoded at the receiver (only one detected symbol stream is recovered at each stage).

Figure 2:
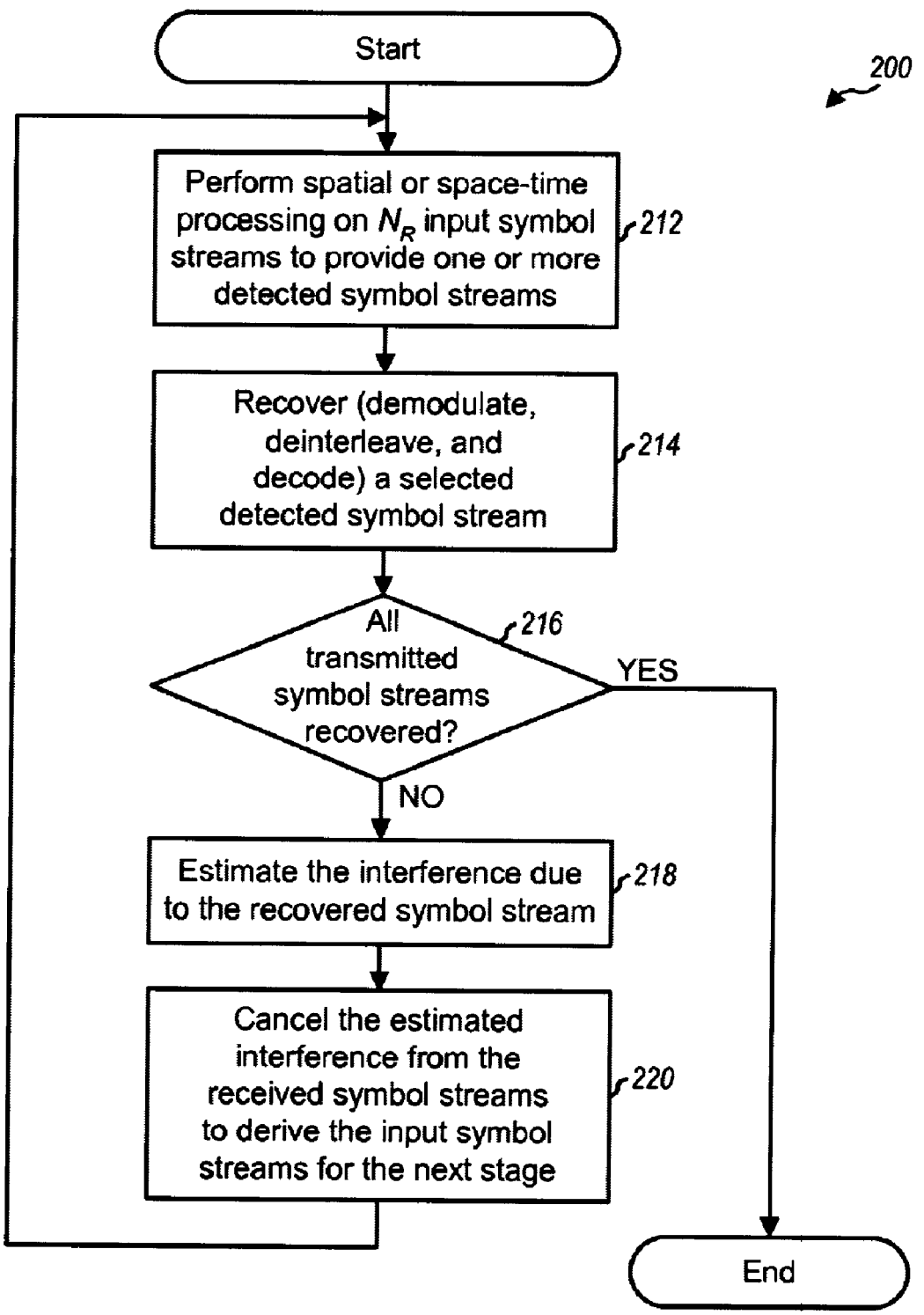
FIG. 2 is a flow diagram illustrating a successive interference cancellation receiver processing technique to process $N_R$ received symbol streams to recover $N_T$ transmitted symbol streams.

FIG. 2 is a flow diagram illustrating the successive cancellation receiver processing technique to process $N_R$ received symbol streams to recover $N_T$ transmitted symbol streams. For simplicity, the following description for FIG. 2 assumes that (1) the number of spatial subchannels is equal to the number of transmit antennas (i.e., $N_S = N_T \leq N_R$) and (2) one independent data stream is transmitted from each transmit antenna.

For the first stage (k=1), the receiver initially performs spatial or space-time processing on the $N_R$ received symbol streams to attempt to separate out the $N_T$ transmitted symbol streams (step 212). For the first stage, the spatial or space-time processing can provide $N_T$ detected symbol streams that are estimates of the $N_T$ (not yet recovered) transmitted symbol streams. One of the detected symbol streams is then selected (e.g., based on a particular selection scheme) and further processed. If the identity of the transmitted symbol stream to be recovered in the stage is known a priori, then the space or space-time processing may be performed to provide only one detected symbol stream for this transmitted symbol stream. In either case, the selected detected symbol stream is further processed (e.g., demodulated, deinterleaved, and decoded) to obtain a decoded data stream, which is an estimate of the data stream for the transmitted symbol stream being recovered in this stage (step 214).

A determination is then made whether or not all transmitted symbol streams have been recovered (step 216). If the answer is yes, then the receiver processing terminates. Otherwise, the interference due to the just-recovered symbol stream on each of the $N_R$ received symbol streams is estimated (step 218). The interference may be estimated by first re-encoding the decoded data stream, interleaving the re-encoded data, and symbol mapping the interleaved data (using the same coding, interleaving, and modulation schemes used at the transmitter unit for this data stream) to obtain a "remodulated" symbol stream, which is an estimate of the transmitted symbol stream just recovered. The remodulated symbol stream is then convolved by each of $N_R$ elements in a channel response vector $\underline{h}_j$ to derive $N_R$ interference components due to the just-recovered symbol stream. The vector $\underline{h}_j$ is a column of the ($N_R \times N_T$) channel response matrix, $\underline{H}$, corresponding to the j-th transmit antenna used for the just-recovered symbol stream. The vector $\underline{h}_j$ includes $N_R$ elements that define the channel response between the j-th transmit antenna and the $N_R$ receive antennas The $N_R$ interference components are then subtracted from the $N_R$ received symbol streams to derive $N_R$ modified symbol streams (step 220). These modified symbol streams represent the streams that would have been received if the just-recovered symbol stream had not been transmitted (i.e., assuming that the interference cancellation was effectively performed).

The processing performed in steps 212 and 214 is then repeated on the $N_R$ modified symbol streams (instead of the $N_R$ received symbol streams) to recover another transmitted symbol stream. Steps 212 and 214 are thus repeated for each transmitted symbol stream to be recovered, and steps 218 and 220 are performed if there is another transmitted symbol stream to be recovered.

For the first stage, the input symbol streams are the $N_R$ received symbol streams from the $N_R$ received antennas. And for each subsequent stage, the input symbol streams are the $N_R$ modified symbol streams from the preceding stage. The processing for each stage proceeds in similar manner. At each stage subsequent to the first stage, the symbol streams recovered in the prior stages are assumed to be cancelled, so the dimensionality of the channel response matrix $\underline{H}$ is successively reduced by one column for each subsequent stage.

The successive cancellation receiver processing thus includes a number of stages, one stage for each transmitted symbol stream to be recovered. Each stage recovers one of the transmitted symbol streams and (except for the last stage) cancels the interference due to this recovered symbol stream to derive the modified symbol streams for the next stage. Each subsequently recovered symbol stream thus experiences less interference and is able to achieve a higher SNR than without the interference cancellation. The SNRs of the recovered symbol streams are dependent on the particular order in which the symbol streams are recovered.

For the successive cancellation receiver processing, the input symbol streams for the k-th stage (assuming that the interference from the symbol streams recovered in the prior k-1 stages have been effectively canceled) may be expressed as:

$$\underline{y}_k = \underline{H}_k \underline{x}_k + \underline{n}, \qquad \text{Eq (2)}$$

where $\underline{y}_k$ is the $N_R \times 1$ input vector for the k-th stage, i.e., $\underline{y}^k = [y_1^k y_2^k \ldots y_{N_R}^k]^T$, where $y_i^k$ is the entry for the i-th received antenna in the k-th stage;

$\underline{x}_k$ is the $(N_T - k + 1) \times 1$ transmitted vector for the k-th stage, i.e., $\underline{x}_k = [x_k x_{k+1} \ldots x_{N_T}]^T$, where $x_j$ is the entry transmitted from the j-th transmit antenna;

$\underline{H}_k$ is the $N_R \times (N_T - k + 1)$ channel response matrix for the MIMO channel, with k-1 columns for the previously recovered symbol streams removed, i.e., $H_k = [\underline{h}_k \ \underline{h}_{k+1} \ldots \underline{h}_{N_T}]$; and $\underline{n}$ is the additive white Gaussian noise For simplicity, equation (2) assumes that the transmitted symbol streams are recovered in the order of the transmit antennas (i.e., the symbol stream transmitted from transmit antenna 1 is recovered first, the symbol stream transmitted from transmit antenna 2 is recovered second, and so on, and the symbol stream transmitted from transmit antenna $N_T$ is recovered last). Equation (2) may be rewritten as:

$$\underline{y}_k = \sum_{j=k}^{N_T} \underline{h}_j x_j + \underline{n}. \qquad \text{Eq (3)}$$

The transmitted symbol stream to be recovered in stage k may be viewed as being projected at a particular angle from an interference sub-space (or plane) $S^I$. The transmitted symbol stream is dependent on (and defined by) the channel response vector $\underline{h}_k$. An interference-free component of the transmitted symbol stream may be obtained by projecting the channel response vector, $\underline{h}_k$, on an interference-free sub-space, which is orthogonal to the interference sub-space. This projection may be achieved by multiplying $\underline{h}_k$ with a filter having a response of $\underline{w}$. The filter that attains the maximum energy after the projection is the one that lies in a sub-space constructed by $\underline{h}_k$ and the interference sub-space $S^I$, where $S^I = \text{span}(\underline{i}_1 \ \underline{i}_2 \ldots \underline{i}_{N_T-k})$, $\underline{i}_m^H \underline{i}_{n} = \delta_{m,n}$, and $\{\underline{i}_n\}$, for $n = 1, 2, \ldots N_T - k$, are orthonormal basis spanning the interference subspace $S^I$. The average energy after the projection is given by:

$$E[|\underline{w}^H \underline{h}_k|^2] = E[|\underline{h}_k^H \underline{h}_k|^2] - E[|\underline{S}^{I^H} \underline{h}_k|^2] \qquad \text{Eq (4)}$$

$$= \frac{N_R}{N_T} - \sum_{j=1}^{N_T-k} \underline{i}_j^H E[|\underline{h}_k \underline{h}_k^H|^2] \underline{i}_j$$

$$= \frac{N_R - N_T + k}{N_T},$$

where $\underline{w}^H \underline{h}_k$ represents the projection of $\underline{h}_k$ on the interference-free sub-space (i.e., the desired component), and $\underline{S}^{I^H} \underline{h}_k$ represents the projection of $\underline{h}_k$ on the interference sub-space (i.e., the interference component).

Equation (4) assumes equal transmit powers being used for the transmit antennas.

The effective SNR for the symbol stream recovered in the k-th stage, $SNR_{\it{eff}}(k)$, may be expressed as:

$$SNR_{\it{eff}}(k) = \frac{P_{tot}(N_R - N_T + k)}{\sigma^2 N_T}, \quad \text{Eq (5)}$$

where $P_{tot}$ is the total transmit power available for data transmission, which is uniformly distributed across the $N_T$ transmit antennas such that $P_{tot}/N_T$ is used for each transmit antenna, and $\sigma^2$ is the noise variance.

The received SNR for all $N_R$ received symbol streams, $SNR_{rx}$, may be defined as:

$$SNR_{rx} = \frac{P_{tot} N_R}{\sigma^2}. \quad \text{Eq (6)}$$

Combining equations (5) and (6), the effective SNR for the symbol stream recovered in the k-th stage may be expressed as:

$$SNR_{\it{eff}}(k) = \left(\frac{N_R - N_T + k}{N_T N_R}\right) SNR_{rx}. \quad \text{Eq (7)}$$

The effective SNR formulation shown in equation (7) is based on several assumptions. First, it is assumed that the interference due to each recovered data stream is effectively canceled and does not contribute to the noise and interference observed by the subsequently recovered symbol streams. Second, it is assumed that no (or low) errors propagate from one stage to another. Third, an optimum filter that maximizes SNR is used to obtain each detected symbol stream. Equation (7) also provides the effective SNR in linear unit (i.e., not in log or dB unit).

As noted above, the transmitted symbol streams may experience different channel conditions and may achieve different SNRs for a given amount of transmit power. If the achieved SNR of each symbol stream is known at the transmitter, then the data rate and coding and modulation scheme for the corresponding data stream may be selected to maximize spectral efficiency while achieving a target packet error rate (PER). However, for some MIMO systems, channel state information indicative of the current channel conditions is not available at the transmitter. In this case, it is not possible to perform adaptive rate control for the data streams.

Conventionally, in some MIMO systems, data is transmitted over the $N_T$ transmit antennas at the same data rates (i.e., uniform distribution of data rates) when channel state information is not available at the transmitter. At the receiver, the $N_R$ received symbol streams may be processed using the successive cancellation receiver processing technique. In one conventional scheme, the SNRs of the ($N_T$−k+1) detected symbol streams at each stage k are determined, and the detected symbol stream with the highest SNR is recovered in that stage. This transmission scheme with uniform distribution of data rates provides sub-optimal performance.

Techniques are provided herein to provide improved performance for a MIMO system when channel state information indicative of the current channel conditions is not available at the transmitter. In an aspect, a non-uniform distribution of data rates is used for the transmitted data streams. The data rates may be selected to achieve (1) a given or specified overall spectral efficiency with a lower minimum received SNR or (2) a higher overall spectral efficiency for a given or specified received SNR. A specific scheme for achieving each of the above objectives is provided below. It can be shown that the non-uniform distribution of data rates generally outperforms the conventional uniform distribution of data rates in many situations.

As shown in equation (7), the effective SNR of each recovered symbol stream is dependent on the particular stage at which it is recovered, as indicated by the factor "k" in the numerator in equation (7). The lowest effective SNR is achieved for the first recovered symbol stream, and the highest effective SNR is achieved for the last recovered symbol stream.

To achieve improved performance, non-uniform distribution of data rates may be used for the data streams transmitted on different antennas (i.e., different spectral efficiencies may be assigned to different transmit antennas), depending on their effective SNRs. At the receiver, the transmitted data streams may be recovered in an ascending order of data rates. That is, the data stream with the lowest data rate is recovered first, the data stream with the next higher data rate is recovered second, and so on, and the data stream with the highest data rate is recovered last.

The data rates to be used for the data streams may be determined by taking into account various considerations. First, earlier recovered symbol streams achieve lower effective SNRs, as shown in equation (7), and further suffer from lower diversity order. In fact, the diversity order at stage k may be given as ($N_R$−$N_T$+k). Moreover, decoding errors from earlier recovered symbol streams propagate to later recovered symbol streams and can affect the effective SNRs of these subsequently recovered symbol streams. The data rates for earlier recovered symbol streams may thus be selected to achieve high confidence in the recovery of these symbol streams and to reduce or limit the error propagation (EP) effect on later recovered symbol streams. Second, the later recovered symbol streams may be more vulnerable to errors if they are designated to support larger spectral efficiencies, even though they may be able to achieve higher effective SNRs.

Various schemes may be implemented to (1) determine the minimum received SNR needed to support a given distribution of data rates (or spectral efficiencies) or, (2) determine the distribution of spectral efficiencies that attains the best performance for a given received SNR. One specific scheme for each of these objectives is described below.

Figure 3:
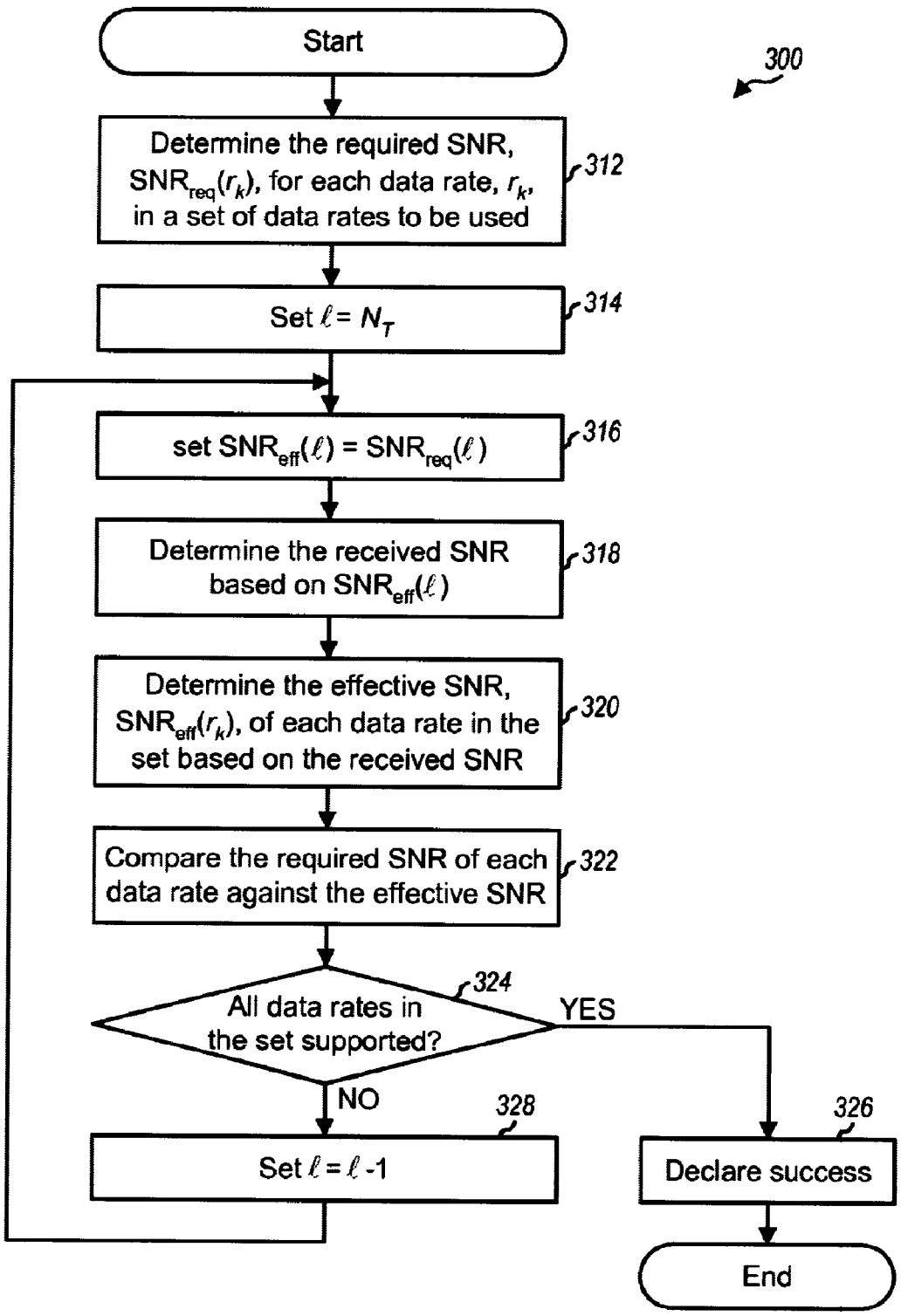
FIG. 3 is a flow diagram of an embodiment of a process for determining the minimum received SNR needed to support a given set of data rates.

FIG. 3 is a flow diagram of an embodiment of a process 300 for determining the minimum received SNR needed to support a given set of data rates. This set of data rates is denoted as $\{r_k\}$, for k=1, 2, ... $N_T$, and are ordered such that $r_1 \leq r_2 \ldots \leq r_{N_T}$. The data rates in set $\{r_k\}$ are to be used for the $N_T$ data streams to be transmitted from the $N_T$ transmit antennas.

Initially, the SNR required at the receiver to support each data rate (or spectral efficiency) in set $\{r_k\}$ is determined (step 312). This may be achieved by using a look-up table of required SNR versus spectral efficiency. The required SNR for a given spectral efficiency may be determined (e.g., using computer simulation) based on an assumption that a single data stream is transmitted over a $\{1, N_R\}$ single-input multiple-output (SIMO) channel, and is further determined for a particular target PER (e.g., 1% PER). The required SNR for a data stream with data rate $r_k$ is denoted as $SNR_{req}(r_k)$. A set of $N_T$ required SNRs is obtained in step 312 for the $N_T$ data streams.

The $N_T$ data rates in set $\{r_k\}$ are associated with NT SNRs required at the receiver to achieve the target PER (e.g., as determined from the look-up table). These $N_T$ data rates are also associated with $N_T$ effective SNRs that may be achieved at the receiver based on a particular received SNR using successive interference cancellation processing at the receiver, as shown in equation (7). The data rates in set $\{r_k\}$ are deemed to be supported if the $N_T$ required SNRs are at or below the corresponding effective SNRs. Visually, the $N_T$ required SNRs may be plotted versus data rates and connected together by a first line, and the $N_T$ effective SNRs may also be plotted versus data rates and connected together by a second line. The data rates in set $\{r_k\}$ are then deemed to be supported if no part of the first line is above the second line.

The margin for a given data rate may be defined as the difference between the effective SNR and the required SNR for the data rate, i.e., margin $(k)=SNR_{eff}(r_k)-SNR_{req}(r_k)$. The data rates in set $\{r_k\}$ may also be deemed to be supported if the margin for each data rate is zero or greater.

The effective SNRs for the data streams are dependent on the received SNR, and may be derived from the received SNR as shown in equation (7). The minimum received SNR needed to support the $N_T$ data rates in set $\{r_k\}$ is the received SNR that results in the effective SNR of at least one data rate being equal to the required SNR (i.e., zero margin). Depending on the specific data rates included in set $\{r_k\}$, the minimum margin (of zero) may be achieved for any one of the $N_T$ data rates in the set.

For the first iteration, the minimum margin is assumed to be achieved by the last recovered data stream, and the index variable l is set to $N_T$ (i.e., $l=N_T$) (step 314). The effective SNR for the l-th recovered data stream is then set equal to its required SNR (i.e., $SNR_{eff}(l)=SNR_{req}(l)$) (step 316). The received SNR is next determined based on the effective SNR of $SNR_{eff}(l)$ for the l-th recovered data stream, using equation (7) (step 318). For the first iteration when $l=N_T$, the received SNR may be determined using equation (7) with $k=N_T$, which may then be expressed as:

$$SNR_{rx}=N_T \cdot SNR_{eff}(N_T). \qquad \text{Eq (8)}$$

The effective SNR of each remaining data stream is then determined based on the received SNR computed in step 318 and using equation (7), for $k=1, 2, \ldots N_T-1$ (step 320). A set of $N_T$ effective SNRs is obtained by step 320 for the $N_T$ data streams.

The required SNR for each data rate in set $\{r_k\}$ is then compared against the effective SNR for the data rate (step 322). A determination is next made whether or not the data rates in set $\{r_k\}$ are supported by the received SNR determined in step 318 (step 324). In particular, if the required SNR for each of the $N_T$ data rates is less than or equal to the effective SNR for that data rate, then the data rates in set $\{r_k\}$ are deemed to be supported by the received SNR and success is declared (step 326). Otherwise, if any one of the $N_T$ data rates exceeds the effective SNR for the data rate, then the data rates in set $\{r_k\}$ are deemed to not be supported by the received SNR. In this case, the variable l is decremented (i.e., $l=l-1$, so that $l=N_T-1$ for the second iteration) (step 328). The process then returns to step 316 to determine the set of effective SNRs for the data rates in set $\{r_k\}$ under the assumption that the minimum margin is achieved for the second to last recovered data stream. As many iterations as necessary may be performed until success is declared in step 326. The received SNR determined in step 318 for the iteration that results in the declaration of success is then the minimum received SNR needed to support the data rates in set $\{r_k\}$.

The process shown in FIG. 3 may also be used to determine whether or not a given set of data rates is supported by a given received SNR. This received SNR may correspond to the operating SNR, $SNR_{op}$, which may be the average or expected (but not necessarily the instantaneous) received SNR at the receiver. The operating SNR may be determined based on measurements at the receiver and may be periodically provided to the transmitter. Alternatively, the operating SNR may be an estimate of the MIMO channel in which the transmitter is expected to operate. In any case, the received SNR is given or specified for the MIMO system.

Referring to FIG. 3, to determine whether or not the given set of data rates is supported by the given received SNR, the required SNR for each data rate may be determined initially (step 312). A set of $N_T$ required SNRs is obtained in step 312 for the $N_T$ data streams. Steps 314, 316, and 318 may be skipped, since the received SNR is already given. The effective SNR of each data stream is then determined based on the given received SNR and using equation (7), for $k=1, 2, \ldots N_T$ (step 320). A set of $N_T$ effective SNRs is obtained in step 320 for the $N_T$ data streams.

The required SNR for each data rate in set $\{r_k\}$ is then compared against the effective SNR for that data rate (step 322). A determination is next made whether or not the data rates in set $\{r_k\}$ are supported by the received SNR. If the required SNR for each of the $N_T$ data rates is less than or equal to the effective SNR for that data rate, then the data rates in set $\{r_k\}$ are deemed to be supported by the received SNR, and success is declared (step 326). Otherwise, if the required SNR for any one of the $N_T$ data rates exceeds the effective SNR for the data rate, then the data rates in set $\{r_k\}$ are deemed to not be supported by the received SNR, and failure is declared.

For clarity, an example is described below for a $\{2, 4\}$ MIMO system with two transmit antennas (i.e., $N_T=2$) and four received antennas (i.e., $N_R=4$) and designated to support an overall spectral efficiency of 3 bits per second per Hertz (bps/Hz). For this example, two sets of data rates are evaluated. The first set includes data rates corresponding to 1 bps/Hz and 2 bps/Hz, and the second set includes data rates corresponding to 4/3 bps/Hz and 5/3 bps/Hz. The performance of each rate set is determined (e.g., based on the process shown in FIG. 3) and compared against one another.

Figure 4:
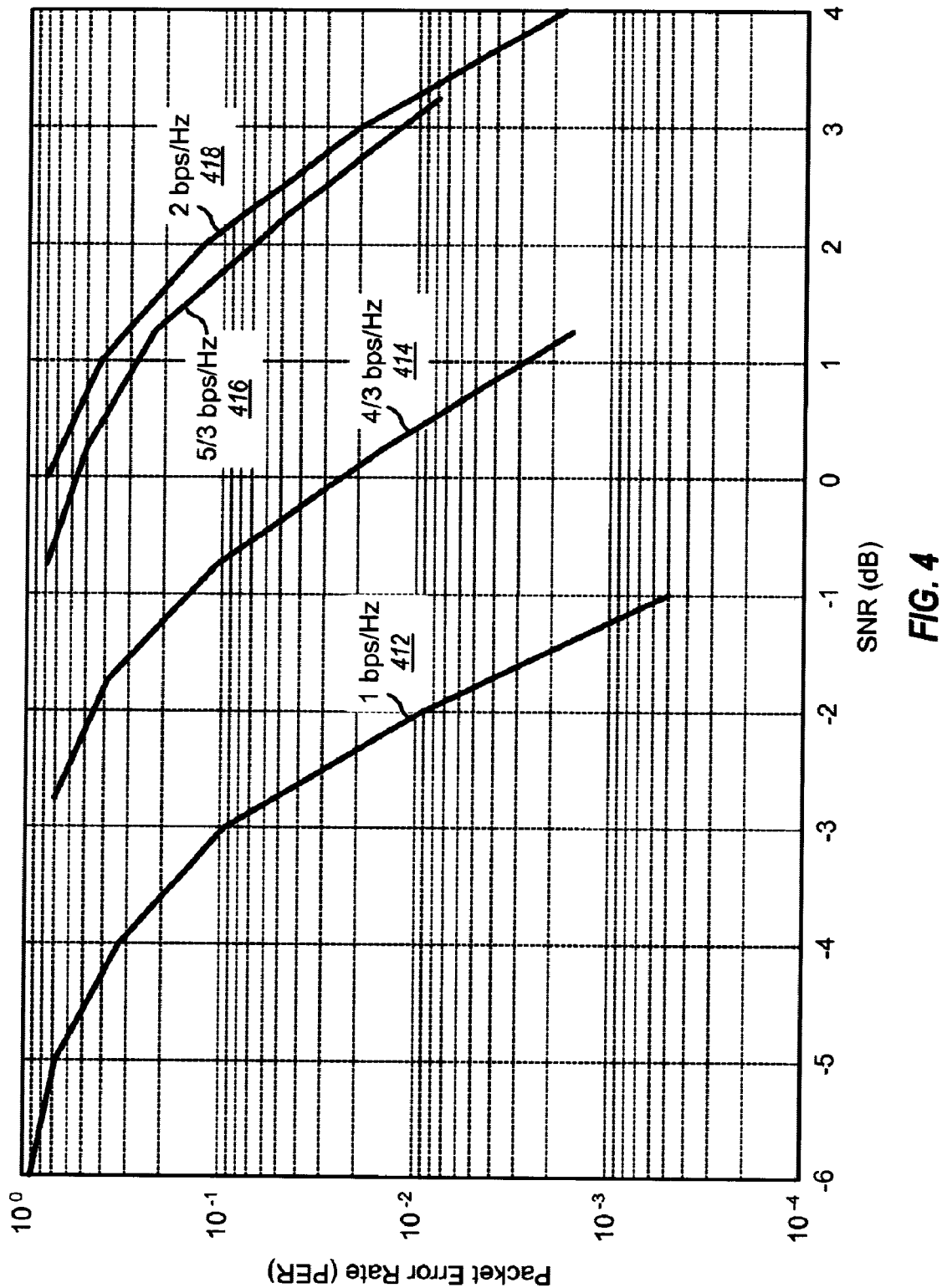
FIG. 4 shows plots of packet error rate (PER) versus SNR for a {1, 4} MIMO system for spectral efficiencies of 1, 4/3, 5/3, and 2 bps/Hz.

FIG. 4 shows plots of PER versus SNR for a $\{1, 4\}$ MIMO system for spectral efficiencies of 1 bps/Hz, 4/3 bps/Hz, 5/3 bps/Hz, and 2 bps/Hz. These plots may be generated by computer simulation or some other means, as is known in the art. A MIMO system is typically designated to operate at a particular target PER. In this case, the SNR required to achieve the target PER for each spectral efficiency may be determined and stored in a look-up table. For example, if the target PER is 1%, then values of −2.0 dB, 0.4 dB, 3.1 dB, and 3.2 dB may be stored in the look-up table for spectral efficiencies of 1, 4/3, 5/3, and 2 bps/Hz, respectively.

For the first rate set, the required SNRs for data streams 1 and 2 with spectral efficiencies of 1 and 2 bps/Hz, respectively, may be determined (step 312 in FIG. 3) using plots 412 and 418 in FIG. 4, as follows:

$SNR_{req}(1)=-2.0\ dB$, for data stream 1 with spectral efficiency of 1 bps/Hz, and $SNR_{req}(2)=3.2\ dB$, for data stream 2 with spectral efficiency of 2 bps/Hz.

The effective SNR of data stream 2 (which is recovered last and under the assumption that the interference from data stream 1 was effectively cancelled) is then set to its required SNR (step 316), as follows:

$$SNR_{eff}(2) = SNR_{req}(2) = 3.2 \ dB$$

The received SNR is then determined based on equation (8) (step 318), as follows:

$$SNR_{rx} = 2 \cdot SNR_{req}(2), \text{ for linear unit, or}$$

$$SNR_{rx} = SNR_{req}(2) + 3.0 \ dB = 6.2 \ dB, \text{ for log unit.}$$

The effective SNR of each remaining data stream (i.e., data stream 1) is next determined based on equation (7) (step 320), as follows:

$$SNR_{eff}(1) = \tfrac{3}{8} \cdot SNR_{rx}, \text{ for linear unit, or}$$

$$SNR_{eff}(1) = SNR \cdot 4.3 \ dB = 1.9 \ dB, \text{ for log unit.}$$

The effective and required SNRs for each data rate in the first rate set are given in columns 2 and 3 in Table 1. The margin for each data rate is also determined and given in the last row in Table 1.

TABLE 1

| Data stream | First rate set | | Second rate set | | Unit |
|---|---|---|---|---|---|
| | 1 | 2 | 1 | 2 | |
| Spectral efficiency | 1 | 2 | 4/3 | 5/3 | bps/Hz |
| SNR$_{eff}$ | 1.9 | 3.2 | 1.8 | 3.1 | dB |
| SNR$_{req}$ | −2.0 | 3.2 | 0.4 | 3.1 | dB |
| margin | 3.9 | 0.0 | 1.4 | 0.0 | dB |

The required SNRs for data stream 1 and 2 are then compared against the effective SNRs for these data streams (step 322). Since $SNR_{req}(2) = SNR_{eff}(2)$ and $SNR_{req}(1) < SNR_{eff}(1)$, this set of data rates is supported by a minimum received SNR of 6.2 dB.

Since the first rate set is deemed to be supported by the first iteration through the process shown in FIG. 3, no additional iterations need to be performed. However, had this first rate set not been supported by a received SNR of 6.2 dB (e.g., if the required SNR for data stream 1 turned out to be greater than 1.9 dB), then another iteration would be performed whereby the received SNR is determined based on $SNR_{req}(1)$ and would be greater than 6.2 dB.

For the second rate set, the required SNRs for data streams 1 and 2 with spectral efficiencies of ⅘ and ⅝ bps/Hz, respectively, may be determined using plots 414 and 416 in FIG. 4, as follows:

$$SNR_{req}(1) = 0.4 \ dB, \text{ for data stream 1 with spectral efficiency of } \tfrac{4}{3} \text{ bps/Hz, and}$$

$$SNR_{req}(2) = 3.1 \ dB, \text{ for data stream 2 with spectral efficiency of } \tfrac{5}{3} \text{ bps/Hz.}$$

The effective SNR of data stream 2 is then set to its required SNR. The received SNR is then determined based on equation (8), as follows:

$$SNR_{rx} = SNR_{req}(2) + 3.0 \ dB = 6.1 \ dB, \text{ for log unit.}$$

The effective SNR of each remaining data rate (i.e., data rate 1) is next determined based on equation (7), as follows:

$$SNR_{eff}(1) = SNR_{rx} - 4.3 dB = 1.8 dB, \text{ for log unit.}$$

The effective and required SNRs for each data rate in the second rate set are given in columns 4 and 5 in Table 1.

The effective SNRs of data streams 1 and 2 are then compared against their required SNRs. Again, since $SNR_{req}(2) = SNR_{eff}(2)$ and $SNR_{req}(1) < SNR_{eff}(1)$, this set of data rates is supported by a minimum received SNR of 6.1 dB.

The above description is for a "vertical" successive interference cancellation scheme whereby one data stream is transmitted from each transmit antenna and, at the receiver, one data stream is recovered at each stage of the successive interference cancellation receiver by processing the stream from one transmit antenna. The plots in FIG. 4 and the look-up table are derived for this vertical scheme.

The techniques described herein may also be used for a "diagonal" successive interference cancellation scheme whereby each data stream is transmitted from multiple (e.g., all $N_T$) transmit antennas (and possibly across multiple frequency bins). At the receiver, the symbols from one transmit antenna may be detected at each stage of the successive interference cancellation receiver, and each data stream may then be recovered from the symbols detected from multiple stages. For the diagonal scheme, another set of plots and another look-up table may be derived and used. The techniques described herein may also be used for other ordering schemes, and this is within the scope of the invention.

For the above example, it can be shown that, for the diagonal successive interference cancellation scheme, the minimum received SNR needed to support a uniform distribution of data rates (i.e., spectral efficiency of 1.5 bps/Hz on each of the two data streams) is approximately 0.6 dB higher than that needed for the second rate set (i.e., spectral efficiencies of ⅘ and ⅝). This gain is achieved without severely complicating the system design.

In order to reduce the minimum received SNR needed to achieve the target PER for a given overall spectral efficiency, the last recovered data stream may be assigned with the smallest possible spectral efficiency that does not violate the no error propagation condition for any of the prior recovered data streams. If the spectral efficiency of the last recovered data stream is reduced, then the spectral efficiency of one or more prior recovered data streams needs to be increased accordingly to achieve the given overall spectral efficiency. The increased spectral efficiency for the earlier recovered data streams would then result in higher required SNRs. If the spectral efficiency of any one of the earlier recovered data streams is increased too high, then the minimum received SNR is determined by the required SNR for this data stream and not by the last recovered data stream (which is the case for the uniform distribution of data rates).

In the above example, the second rate set needs a smaller received SNR because the later recovered data stream 2 is assigned a smaller spectral efficiency that does not violate the no error propagation condition for the first recovered data stream 1. For the first rate set, the spectral efficiency assigned to data stream 1 is too conservative so that, while it assures no error propagation, it also hurts the overall performance by forcing a higher spectral efficiency to be assigned to data stream 2. In comparison, the second rate set assigns a more realistic spectral efficiency to data stream 1 that still assures no error propagation (albeit with less confidence in comparison to the first rate set). As shown in Table 1, the margin for data stream 1 for the first rate set is 3.9 dB while the margin for data stream 1 for the second rate set is 1.4 dB.

The techniques described herein may also be used to determine a set of data rates that maximizes the overall spectral efficiency for a given received SNR (which may be the operating SNR for the MIMO system). In this case, a set of effective SNRs may be initially determined for the $N_T$ data streams based on the given received SNR and using equation (7). For each effective SNR in the set, the highest spectral efficiency that may be supported by this effective SNR for the target PER is then determined. This may be achieved by using another look-up table that stores values for spectral efficiency versus effective SNR. A set of $N_T$ spectral efficiencies is obtained for the set of $N_T$ effective SNRs. A set of data rates corresponding to this set of $N_T$ spectral efficiencies is then determined and may be used for the $N_T$ data streams. This rate set maximizes the overall spectral efficiency for the given received SNR.

In the description above, the effective SNRs of the data streams are determined based on the received SNR and using equation (7). This equation includes various assumptions, as noted above, which are generally true (to a large extent) for typically MIMO systems. Moreover, equation (7) is also derived based on the use of successive interference cancellation processing at the receiver. A different equation or a look-up table may also be used to determine the effective SNRs of the data streams for different operating conditions and/or different receiver processing techniques, and this is within the scope of the invention.

For simplicity, the data rate determination has been described specifically for a MIMO system. These techniques may also be used for other multi-channel communication systems.

A wideband MIMO system may experience frequency selective fading, which is characterized by different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols.

OFDM may be used to combat ISI and/or for some other considerations. An OFDM system effectively partitions the overall system bandwidth into a number of ($N_F$) frequency subchannels, which may also be referred to as subbands or frequency bins. Each frequency subchannel is associated with a respective subcarrier on which data may be modulated. The frequency subchannels of the OFDM system may also experience frequency selective fading, depending on the characteristics (e.g., the multipath profile) of the propagation path between the transmit and receive antennas. Using QFDM, the ISI due to frequency selective fading may be combated by repeating a portion of each OFDM symbol (i.e., appending a cyclic prefix to each OFDM symbol), as is known in the art.

For a MIMO system that utilizes OFDM (i.e., a MIMO-OFDM system), $N_F$ frequency subchannels are available on each of the $N_S$ spatial subchannels for data transmission. Each frequency subchannel of each spatial subchannel may be referred to as a transmission channel, and $N_F \cdot N_S$ transmission channels are available for data transmission between the $N_T$ transmit antennas and $N_R$ receive antennas. The data rate determination described above may be performed for the set of $N_T$ transmit antennas, similar, to that described above for the MIMO system. Alternatively, the data rate determination may be performed independently for the set of $N_T$ transmit antennas for each of the $N_F$ frequency subchannels

TRANSMITTER SYSTEM

Figure 5:
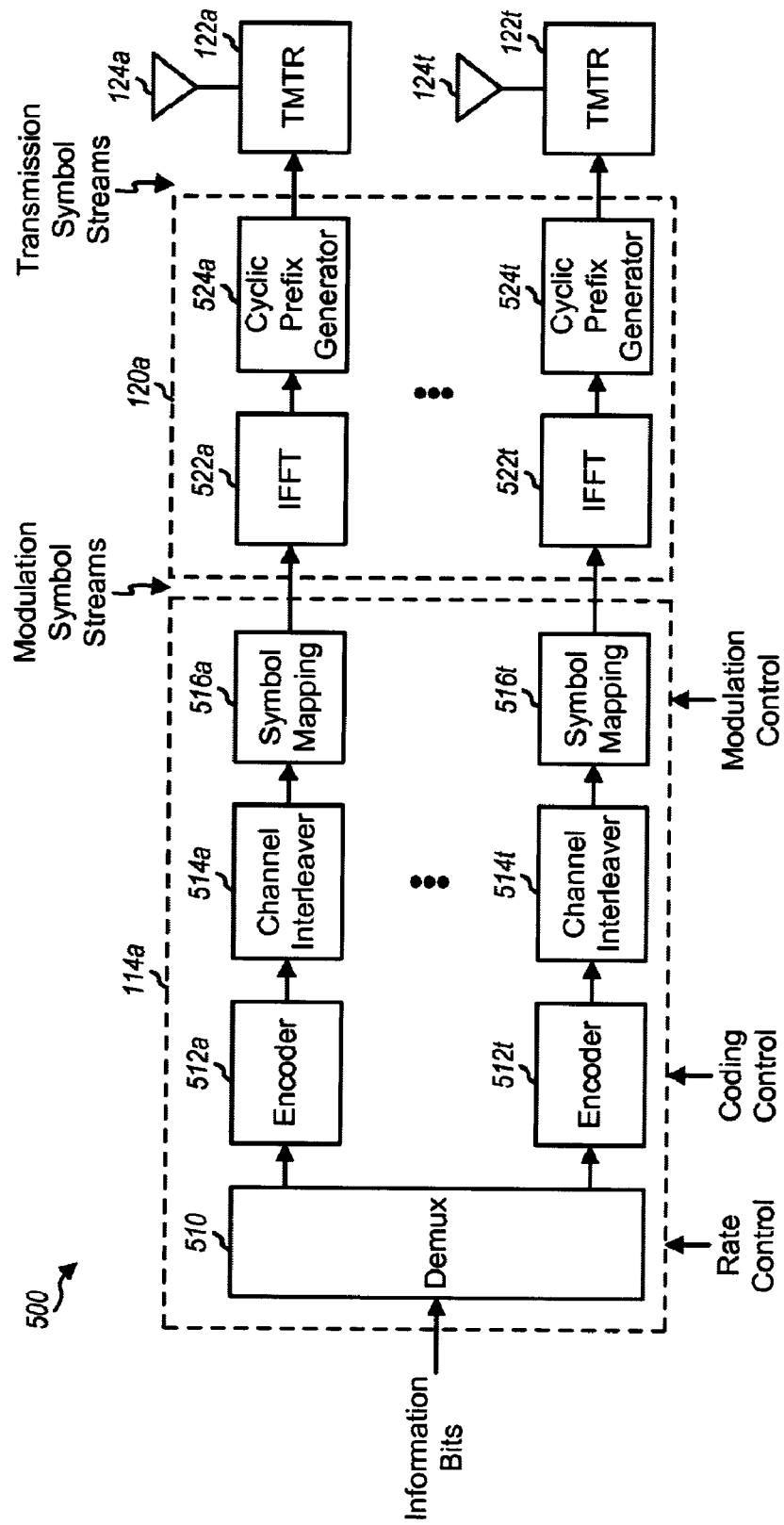
FIG. 5 is a block diagram of an embodiment of a transmitter unit.

FIG. 5 is a block diagram of a transmitter unit 500, which is an embodiment of the transmitter portion of transmitter system 110 in FIG. 1. In this embodiment, a separate data rate and coding and modulation scheme may be used for each of the $N_T$ data streams to be transmitted on the $N_T$ transmit antennas (i.e., separate coding and modulation on a per-antenna basis). The specific data rate and coding and modulation schemes to be used for each transmit antenna may be determined based on controls provided by controller 130, and the data rates may be determined as described above.

Transmitter unit 500 includes (1) a TX data processor 114a that receives, codes, and modulates each data stream in accordance with a separate coding and modulation scheme to provide modulation symbols and (2) a TX MIMO processor 120a that may further process the modulation symbols to provide transmission symbols if OFDM is employed. TX data processor 114a and TX MIMO processor 120a are one embodiment of TX data processor 114 and TX MIMO processor 120, respectively, in FIG. 1.

In the specific embodiment shown in FIG. 5, TX data processor 114a includes a demultiplexer 510, $N_T$ encoders 512a through 512t, $N_T$ channel interleavers 514a through 514t, and $N_T$ symbol mapping elements 516a through 516t, (i.e., one set of encoder, channel interleaver, and symbol mapping element for each transmit antenna). Demultiplexer 510 demultiplexes the traffic data (i.e., the information bits) into $N_T$ data streams for the $N_T$ transmit antennas to be used for data transmission. The $N_T$ data streams may be associated with different data rates, as determined by the rate control. Each data stream is provided to a respective encoder 512.

Each encoder 512 receives and codes a respective data stream based on the specific coding scheme selected for that data stream to provide coded bits. The coding increases the reliability of the data transmission. The coding scheme may include any combination of cyclic redundancy check (CRC) coding, convolutional coding, Turbo coding, block coding, and so on. The coded bits from each encoder 512 are then provided to a respective channel interleaver 514, which interleaves the coded bits based on a particular interleaving scheme. The interleaving provides time diversity for the coded bits, permits the data to be transmitted based on an average SNR for the transmission channels used for the data stream, combats fading, and further removes correlation between coded bits used to form each modulation symbol.

The coded and interleaved bits from each channel interleaver 514 are provided to a respective symbol mapping element 516, which maps these bits to form modulation symbols. The particular modulation scheme to be implemented by each symbol mapping element 516 is determined by the modulation control provided by controller 130. Each symbol mapping element 516 groups sets of $q_j$ coded and interleaved bits to form non-binary symbols, and further maps each non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j=2^{q_j}$. Symbol mapping elements 516a through 516t then provide $N_T$ streams of modulation symbols.

In the specific embodiment shown in FIG. 5, TX MIMO processor 120a includes $N_T$ OFDM modulators, with each OFDM modulator including an inverse Fourier transform (IFFT) unit 522 and a cyclic prefix generator 524. Each IFFT 522 receives a respective modulation symbol stream from a corresponding symbol mapping element 516. Each IFFT 522 groups sets of $N_F$ modulation symbols to form corresponding modulation symbol vectors, and converts each modulation symbol vector into its time-domain representation (which is referred to as an OFDM symbol) using the inverse fast Fourier transform. IFFT 522 may be designed to perform the inverse transform on any number of frequency subchannels (e.g., 8, 16, 32, ..., $N_F$, ...). For each OFDM symbol, cyclic prefix generator 524 repeats a portion of the OFDM symbol to form a corresponding transmission symbol. The cyclic prefix ensures that the transmission symbol retains its orthogonal properties in the presence of multipath delay spread, thereby improving performance against deleterious path effects such as channel dispersion caused by frequency selective fading. Cyclic prefix generator 524 then provides a stream of transmission symbols to an associated transmitter 122. If OFDM is not employed, then TX MIMO processor 120a simply provides the modulation symbol stream from each symbol mapping element 516 to the associated transmitter 122.

Each transmitter 122 receives and processes a respective modulation symbol stream (for MIMO without OFDM) or transmission symbol stream (for MIMO with OFDM) to generate a modulated signal, which is then transmitted from the associated antenna 124.

Other designs for the transmitter unit may also be implemented and are within the scope of the invention.

The coding and modulation for MIMO systems with and without OFDM are described in further detail in the following U.S. patent applications:

U.S. patent application Ser. No. 09/993,087, entitled "Multiple-Access Multiple-Input Multiple-Output (MIMO) Communication System," filed Nov. 6, 2001;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001;

U.S. patent application Ser. No. 09/776,075, entitled "Coding Scheme for a Wireless Communication System," filed Feb. 1, 2001; and U.S. patent application Ser. No. 09/532,492, entitled "High Efficiency, High Performance Communications System Employing Multi-Carrier Modulation," filed March 30, 2000.

These applications are all assigned to the assignee of the present application and incorporated herein by reference application Ser. No. 09/776,075 describes a coding scheme whereby different rates may be achieved by coding the data with the same base code (e.g., a convolutional or Turbo code) and adjusting the puncturing to achieve the desired rate. Other coding and modulation schemes may also be used, and this is within the scope of the invention.

RECEIVER SYSTEM

FIG. 6 is a block diagram of a RX MIMO/data processor 160a capable of implementing the successive cancellation receiver processing technique. RX MIMO/data processor 160a is one embodiment of RX MIMO/data processor 160 in FIG. 1. The signals transmitted from $N_T$ transmit antennas are received by each of $N_R$ antennas 152a through 152r and routed to a respective receiver 154. Each receiver 154 conditions (e.g., filters, amplifies, and downconverts) a respective received signal and digitizes the conditioned signal to provide a corresponding stream of data samples.

For MIMO without OFDM, the data samples are representative of the received symbols. Each receiver 154 would then provide to RX MIMO/data processor 160a a respective received symbol stream, which includes a received symbol for each symbol period.

For MIMO with OFDM, each receiver 154 further includes a cyclic prefix removal element and an FFT processor (both of which are not shown in FIG. 6 for simplicity). The cyclic prefix removal element removes the cyclic prefix, which has been inserted at the transmitter system for each transmission symbol, to provide a corresponding received OFDM symbol. The FFT processor then transforms each received OFDM symbol to provide a vector of $N_F$ received symbols for the $N_F$ frequency subchannels for that symbol period. $N_R$ received symbol vector streams are then provided by $N_R$ receivers 154 to RX MIMO/data processor 160a.

For MIMO with OFDM, RX MIMO/data processor 160a may demultiplex the $N_R$ received symbol vector streams into $N_F$ groups of $N_R$ received symbol streams, one group for each frequency subchannel, with each group including $N_R$ streams of received symbols for one frequency subchannel. RX MIMO/data processor 160a may then process each group of $N_R$ received symbol streams in similar manner as for the $N_R$ received symbol streams for MIMO without OFDM. RX MIMO/data processor 160a may also process the received symbols for MIMO with OFDM based on some other ordering scheme, as is known in the art. In any case, RX MIMO/data processor 160a processes the $N_R$ received symbol streams (for MIMO without OFDM) or each group of $N_R$ received symbol streams (for MIMO with OFDM).

In the embodiment shown in FIG. 6, RX MIMO/data processor 160a includes a number of successive (i.e., cascaded) receiver processing stages 610a through 610n, one stage for each of the transmitted data streams to be recovered. Each receiver processing stage 610 (except for the last stage 610n) includes a spatial processor 620, an RX data processor 630, and an interference canceller 640. The last stage 610n includes only spatial processor 620n and RX data processor 630n.

For the first stage 610a, spatial processor 620a receives and processes the $N_R$ received symbol streams (denoted as the vector $\underline{y}^1$) from receivers 154a through 154r based on a particular spatial or space-time receiver processing technique to provide (up to) $N_T$ detected symbol streams (denoted as the vector $\hat{\underline{x}}^1$). For MIMO with OFDM, the $N_R$ received symbol streams comprise the received symbols for one frequency subchannel. The detected symbol stream corresponding to the lowest data rate, $\hat{x}_1$, is selected and provided to RX data processor 630a. Processor 630a further processes (e.g., demodulates, deinterleaves, and decodes) the detected symbol stream, $\hat{x}_1$, selected for the first stage to provide a decoded data stream. Spatial processor 620a further provides an estimate of the channel response matrix $\underline{H}$, which is used to perform the spatial or space-time processing for all stages.

For the first stage 610a, interference canceller 640a also receives the $N_R$ received symbol streams from receivers 154 (i.e., the vector $\underline{y}^1$). Interference canceller 640a further receives the decoded data stream from RX data processor 630a and performs the processing (e.g., encoding, interleaving, modulation, channel response, and so on) to derive $N_R$ remodulated symbol streams (denoted as the vector $\underline{i}^1$) that are estimates of the interference components due to the just-recovered data stream. The remodulated symbol streams are then subtracted from the first stage's input symbol streams to derive $N_R$ modified symbol streams (denoted as the vector $\underline{y}^2$), which include all but the subtracted (i.e., cancelled) interference components. The $N_R$ modified symbol streams are then provided to the next stage.

For each of the second through last stages 610b through 610n, the spatial processor for that stage receives and processes the $N_R$ modified symbol streams from the interference canceller in the preceding stage to derive the detected symbol streams for that stage. The detected symbol stream corresponding to the lowest data rate at that stage is selected and processed by the RX data processor to provide the decoded data stream for that stage. For each of the second through second-to-last stages, the interference canceller in that stage receives the $N_R$ modified symbol streams from the interference canceller in the preceding stage and the decoded data stream from the RX data processor within the same stage, derives $N_R$ remodulated symbol streams, and provides $N_R$ modified symbol streams for the next stage.

The successive cancellation receiver processing technique is described in further detail in the aforementioned U.S. patent application Ser. Nos. 09/993,087 and 09/854,235.

The spatial processor 620 in each stage implements a particular spatial or space-time receiver processing technique. The specific receiver processing technique to be used is typically dependent on the characteristics of the MIMO channel, which may be characterized as either non-dispersive or dispersive. A non-dispersive MIMO channel experiences flat fading (i.e., approximately equal amount of attenuation across the system bandwidth), and a dispersive MIMO channel experiences frequencyselective fading (e.g., different amounts of attenuation across the system bandwidth).

For a non-dispersive MIMO channel, spatial receiver processing techniques may be used to process the received signals to provide the detected symbol streams. These spatial receiver processing techniques include a channel correlation matrix inversion (CCMI) technique (which is also referred to as a zero-forcing technique) and a minimum mean square error (MMSE) technique. Other spatial receiver processing techniques may also be used and are within the scope of the invention.

For a dispersive MIMO channel, time dispersion in the channel introduces inter-symbol interference (ISI). To improve performance, a receiver attempting to recover a particular transmitted data stream would need to ameliorate both the interference (or "crosstalk") from the other transmitted data streams as well as the ISI from all data streams. To combat both crosstalk and ISI, space-time receiver processing techniques may be used to process the received signals to provide the detected symbol streams. These space-time receiver processing techniques include a MMSE linear equalizer (MMSE-LE), a decision feedback equalizer (DFE), a maximum-likelihood sequence estimator (MLSE), and so on.

The CCMI, MMSE, MMSE-LE, and DFE techniques are described in detail in the aforementioned U.S. patent application Ser. Nos. 09/993,087, 09/854,235, 09/826,481, and 09/956,44.

The data rate determination and data transmission techniques described herein may be implemented by various means. For example, these techniques may be implemented in hardware, software, or a combination thereof. For a hardware implementation, the elements used to determinate data rates at the transmitter and the data transmission at the transmitter/receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, certain aspects of the data rate determination and the processing at the transmitter/receiver may be implemented with modules (e.g., procedures, functions, and so on) that perform the functions described herein. The software codes may be stored in a memory unit (e.g., memory 132 in FIG. 1) and executed by a processor (e.g., controller 130). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device comprising:
   a plurality of antennas configured to receive a plurality of symbol streams;
   a first processor configured to process the plurality of received symbol streams and to provide a plurality of detected symbol streams, one detected symbol stream for each stage of a successive interference cancellation processing; and
   a second processor configured to process each detected symbol stream to provide a corresponding decoded data stream and to determine a received signal-to-noise-and-interference ratio (SNR) and an effective SNR for each of the plurality of detected symbol streams based on the received SNR.

2. The apparatus of claim 1, wherein at least two data rates of at least two of the plurality of received symbol streams are unequal.

3. The apparatus of claim 1, wherein the second processor is further configured to compare a required SNR for each symbol stream against the effective SNR for the symbol stream and to determine whether or not a rate for each symbol stream is supported based on the comparison.

4. The apparatus of claim 3, wherein the required SNR is a minimum SNR for a communication system utilizing the apparatus.

5. The apparatus of claim 1, wherein the first processor and the second processor comprise a single integrated processor.

6. A method for determining data rates for a plurality of data streams to be transmitted via a plurality of transmission channels, comprising:

determining a required channel state information parameter for each of a plurality of data rates that may be used for the plurality of data streams, wherein at least two of the data rates are unequal;

comparing the required channel state information parameter for each data stream against an effective channel state information parameter for the data stream; and determining whether or not some of the plurality of data rates are supported based on comparing.

7. The method of claim 6, wherein the effective channel state information parameter comprises an effective signal-to-noise-and-interfeteiice ratio (SNR) and the required channel state information parameter comprises the required SNR.

8. The method of claim 7, wherein the effective SNR for each data stream is further determined based on a received SNR indicative of an operating condition of the plurality of transmission channels.

9. The method of claim 7, wherein the received SNR is determined based on the required SNR for one of the plurality of data streams.

10. The method of claim 7, wherein the plurality of data rates are deemed to be supported if the required SNR for each data rate is less than or equal to the effective SNR far the data rate.

11. The method of claim 6, further comprising:

evaluating a plurality of sets of data rates; and selecting a rate set for the plurality of data streams based upon a minimum value for the required channel state information parameter.

12. The method of claim 6, wherein the data rates in each rate set are selected to achieve a specified overall spectral efficiency.

13. The method of claim 6, wherein the some of the plurality of data rates comprises all of the data rates.

14. The method of claim 6, wherein the plurality of data streams are transmitted over a plurality of transmit antennas in a multiple-input multiple-output (MIMO) communication system.

15. An apparatus in a multi-channel communication system, comprising:

means for determining a required channel state information parameter for each of a plurality of data rates that may be used for the plurality of data streams;

means for comparing the required channel state information parameter for each data stream against an effective channel state information parameter for the data stream; and means for determining whether or not some of the plurality of data rates are supported based on comparing.

16. The apparatus of claim 15, wherein the effective channel state information parameter comprises an effective signal-to-noise-and-interference ratio (SNR) and the required channel state information parameter comprises the required SNR.

17. The apparatus of claim 15, further comprising:

means for evaluating a plurality of sets of data rates; and means for selecting a rate set for the plurality of data streams based upon a minimum value for the required channel state information parameter.

18. The apparatus of claim 15, wherein the means for selecting the rate set comprises means for selecting the raze set to achieve a specified overall spectral efficiency.

19. The apparatus of claim 15, wherein the some of the plurality of data rates comprises all of the data rates.

20. The apparatus of claim 15, wherein the plurality of data streams are transmitted over a plurality of transmit antennas in a multiple-input multiple-output (MIMO) communication system.

21. A computer readable medium embodying instructions for performing a method for determining data rates for a plurality of data streams to be transmitted via a plurality of transmission channels, the method comprising:

determining a required channel state information parameter for each of a plurality of data rates that may be used for the plurality of data streams, wherein at least two of the data rates are unequal;

comparing the required channel state information parameter for each data stream against an effective channel state information parameter for the data stream; and determining whether or not some of the plurality of data rates are supported based on comparing.

22. The computer readable medium of claim 21, wherein the effective channel state information parameter comprises an effective signal-to-noise-and-interference ratio (SNR) and the required channel state information parameter comprises the required SNR.

23. The computer readable medium of claim 22, wherein the effective SNR for each data stream is further determined based on a received SNR indicative of an operating condition of the plurality of transmission channels.

24. The computer readable medium of claim 22, wherein the received SNR is determined based on the required SNR for one of the plurality of data streams.

25. The computer readable medium of claim 22, wherein the plurality of data rates are deemed to be supported if the required SNR for each data rate is less than or equal to the effective SNR for the data rate.

26. The computer readable medium of claim 21, the method further comprising:

evaluating a plurality of sets of data rates; and selecting a rate set for the plurality of data streams based upon a minimum value for the required channel state information parameter.

27. The computer readable medium of claim 21, wherein the data rates in each rate set are selected to achieve a specified overall spectral efficiency.

28. The computer readable medium of claim 21, wherein the some of the plurality of data rates comprises all of the data rates.

29. The computer readable medium of claim 21, wherein the plurality of data streams are transmitted over a plurality of transmit antennas in a multiple-input multiple-output (MIMO) communication system.

* * * * *